Figure 1:
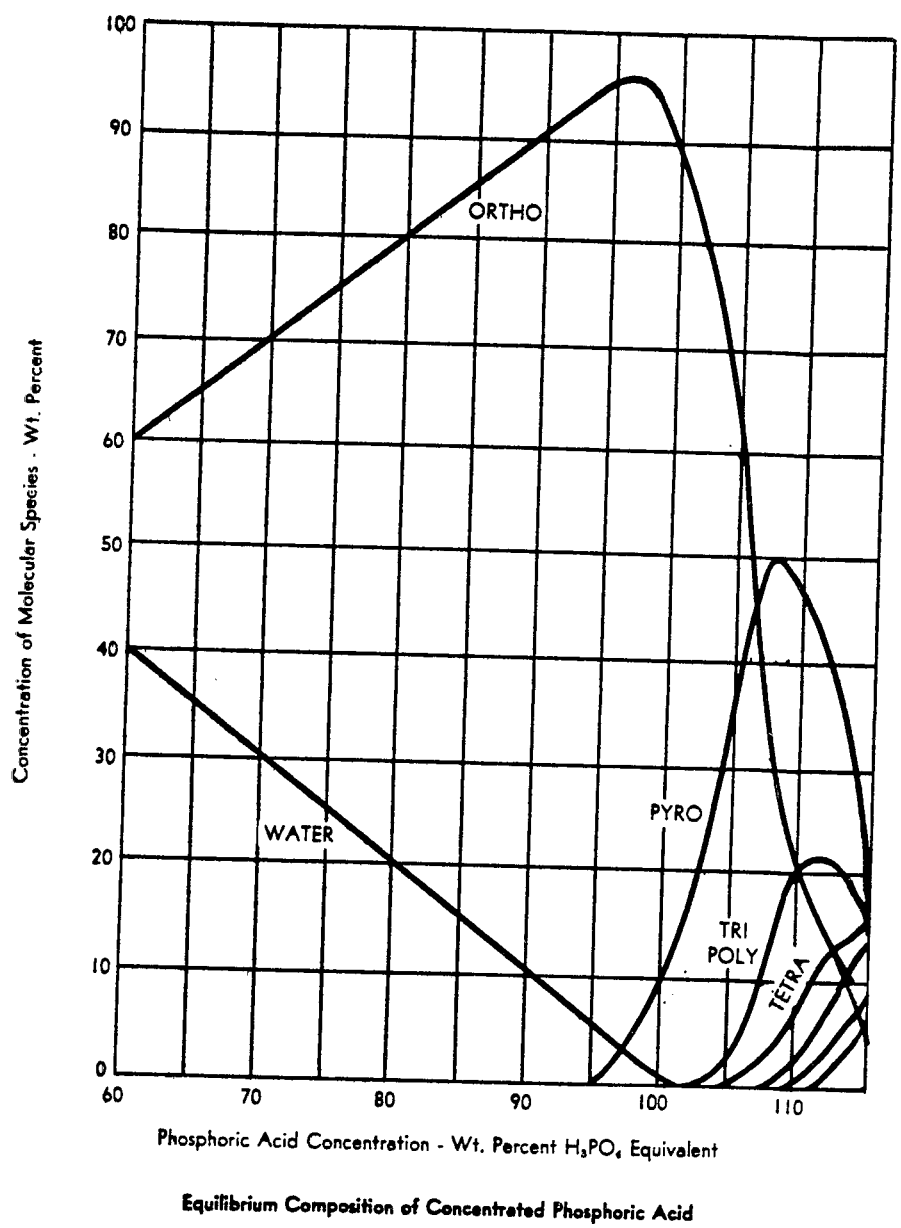

United States Patent [19]

Ralston et al.

[11] 4,436,628

[45] Mar. 13, 1984

[54] POLYPHOSPHORIC ACID AS A SCALE AND CORROSION INHIBITOR

[75] Inventors: Paul H. Ralston, Bethel Park; Sandra L. Whitney, North Fayette Township, Oakdale County, both of Pa.

[73] Assignee: Calgon Corporation, Pittsburgh, Pa.

[21] Appl. No.: 419,868

[22] Filed: Sep. 20, 1982

Related U.S. Application Data

[63] Continuation-in-part of Ser. No. 408,335, Aug. 16, 1982, abandoned.

[51] Int. Cl.$^3$ ............................................. C02F 5/08
[52] U.S. Cl. ................................... 210/697; 252/175; 252/389.2; 252/389 R; 422/18
[58] Field of Search ....................... 210/697–701; 252/175, 181, 389.2; 422/14, 18

[56] References Cited

U.S. PATENT DOCUMENTS

| | | | |
|---|---|---|---|
| 3,130,002 | 4/1964 | Fochs | 210/697 |
| 3,793,194 | 2/1974 | Zecher | 210/697 |
| 4,018,701 | 4/1977 | Ralston et al. | 422/18 |
| 4,108,790 | 8/1978 | Fouroulis | 252/389.2 |
| 4,172,032 | 10/1979 | Farley | 252/389.2 |
| 4,209,398 | 6/1980 | Ii et al. | 422/17 |
| 4,297,237 | 10/1981 | Boffardi | 252/389.2 |

OTHER PUBLICATIONS

"Phospholeum$^R$", Monsanto Chemical Company Technical Bulletin I-210, Nov. 1961.

*Primary Examiner*—Peter A. Hruskocki
*Attorney, Agent, or Firm*—Michael C. Sudol; R. Brent Olson

[57] ABSTRACT

The instant invention is directed to a process for the inhibition of scale and corrosion formation in an aqueous system, comprising adding to the system about 0.1 to 100 ppm, by weight based on the total aqueous content of said system, of 103 to 115% polyphosphoric acid, or neutral salts thereof.

2 Claims, 1 Drawing Figure

Equilibrium Composition of Concentrated Phosphoric Acid

Equilibrium Composition of Concentrated Phosphoric Acid

POLYPHOSPHORIC ACID AS A SCALE AND CORROSION INHIBITOR

BACKGROUND OF THE INVENTION

This is a continuation-in-part application of U.S. Ser. No. 408,335, filed Aug. 16, 1982 now abandoned.

The present invention relates to a method of inhibiting the formation of scale deposits and corrosion on metallic surfaces of water-carrying systems, particularly, with regard to corrosion, where the water of the system is oxygen-bearing.

The term "metallic", is used herein, is intended to include metallic and metal-containing materials comprising ferrous, non-ferrous or alloy metal compositions.

Generally, scale deposits are incrustation coatings which may be formed from a wide variety of simple and complex inorganic salts which accummulate on the metallic surfaces of a water-carrying system through a number of different causes. While the method and compositions of the present invention have been found particularly useful in providing inhibition of calcium carbonate and calcium sulfate scales, inhibition of magnesium hydroxide, calcium fluoride, calcium phosphate, and other common scales may also be obtained. Various industrial and commercial water-carrying systems are subject to scale formation problems. Scale is of particular concern in heat exchange systems employing water, such as, for example, evaporators, and once-through and open recirculating water cooling systems.

The water employed in these systems ordinarily will contain a number of dissolved salts, the amount and nature of which will, of course, depend upon the source of the water employed. Thus, the water usually contains alkaline earth metal cations, primarily calcium and magnesium, and such anions as bicarbonate, carbonate, sulfate, silicate, phosphate, oxalate, fluoride, and so forth. Combination products of these anions and cations will precipitate from the water in which they are carried to form scale deposits when the concentration of the anion and cation comprising the combination or reaction product exceed the solubility of the reaction product. Thus, when the concentrations of calcium ion and carbonate ion exceed the solubility of the calcium carbonate reaction product, a solid phase of calcium carbonate will form as a precipitate. Precipitation of the reaction product will continue until the solubility product concentrations of the constituent ions are no longer exceeded.

Numerous factors may be responsible for producing a condition of supersaturation for a particular reaction product. Among such factors are changes in the pH of the water system, evaporation of the water phase, rate of heat transfer, amount of dissolved solids, and changes in the temperature or pressure of the system.

For evaporators and similar heat exchange systems, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. As a result, the solubility of the scale-forming salt reaction product is first exceeded in this thin film, and crystallization of scale results directly on the heating surface.

In addition to this, a common source of scale in high temperature systems is the breakdown of calcium bicarbonate to form calcium carbonate, water and carbon dioxide under the influence of heat. For open recirculating cooling water systems, in which a cooling tower, spray pond, evaporative condenser, and the like serve to dissipate heat by evaporation of water, the chief factor which promotes scale formation is concentration of solids dissolved in the water by repeated evaporation of portions of the water phase. Thus, even a water which is not scale-forming on a once-through basis usually will become scale-forming when concentrated two, four or six times. The formation of scale deposits poses a serious problem in a number of regards. The different types of scale which are formed all possess a low degree of heat conductivity. Thus, a scale deposit is essentially an insulating layer imposed across the path of heat travel from whatever source to the water of the system. In the case of a boiler system, the retarded heat transfer causes a loss in evaporator efficiency. Increased input of heat to compensate for this loss results in overheating of the boiler metal and consequent tube failures. In addition to this problem, scale formation facilitates corrosive processes, and a substantial scale deposit will interfere materially with fluid flow. Consequently, scale is an expensive problem in many industrial water systems, causing delays and shutdowns for cleaning and removal.

Corrosion of the metallic surfaces of a water-carrying system consists of the destruction of the metal by chemical or electrochemical reaction of the metal with its immediate environment.

Where the corrosion is electrochemical in nature, a transfer or exchange of electrons is necessary for the corrosion reaction to proceed. When corrosion of the metal takes place, two partial electrochemical processes occur, and must occur, simultaneously. There is an anodic oxidation reaction in which metal ions go into solution, leaving behind electrons; and a cathodic reduction reaction in which species in the solution are reduced by consuming the electrons produced by the anodic reaction. Where the metal is ferrous or ferrous-containing, and the water system contains oxygen, these two processes may be illustrated by the following equations:

Anodic oxidation: $Fe \rightarrow Fe^{++} + 2e^-$

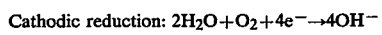

Cathodic reduction: $2H_2O + O_2 + 4e^- \rightarrow 4OH^-$

The two ionic reaction products, ferrous ion and hydroxyl ion, combine to form ferrous hydroxide, Fe(OH)$_2$, which is then oxidized to form rust, ferric hydroxide, Fe(OH)$_3$. For ferrous or ferrous-containing, as well as other metals in water systems, the principal factors influencing the corrosion process are the characteristics of the water of the system, the rate of water flow, the temperature of the system and the contact of dissimilar metals in the system. The variable characteristics of the water which determine its corrosiveness are its dissolved oxygen concentration, carbon dioxide content, pH and concentration of dissolved solids. Other factors may be involved, as, for example, the presence of free mineral acid, hydrogen sulfide, sulfur dioxide, and so forth.

The presence of oxygen dissolved in the water of a system is primarily the result of contact of the water with the atmosphere. The oxygen solubility in water is temperature and pressure dependent, with an increase in temperature lowering the oxygen solubility.

Corrosion produced by the presence of oxygen in the water of a system can take place in the form of small pits or depressions. As the corrosive process continues, these pits or depressions increase in area and depth and a nodule of corrosion products is formed. The corrosive attack is more severe when taking place in the form of pits or depressions since this permits deeper penetration of the metal and more rapid failure at these points.

A BRIEF DESCRIPTION OF THE DRAWING

FIG. 1 graphs the equilibrium composition of concentrated phosphoric acid.

DESCRIPTION OF THE INVENTION

The instant invention is directed to a process for the inhibition of scale and corrosion formation in an aqueous system, comprising adding to the system about 0.1 to 100 ppm, by weight based on the total aqueous content of said system, of about 103 to 115% polyphosphoric acid, or the neutral salts thereof.

"103 to 115% polyphosphoric acid" is defined as the equilibrium composition of concentrated phosphoric acid with a 103 to 115 weight percent orthophosphoric acid equivalent. As is evident from FIG. 1, 103 to 115% polyphosphoric acid contains 5 to 74% orthophosphoric acid ($H_3PO_4$), 0 to 22% tripolyphosphoric acid ($H_5P_3O_{10}$), 15 to 50% pyrophosphoric acid ($H_4P_2O_7$), 0 to 15% sodium tetra phosphoric acid ($H_6P_4O_{13}$) and 0 to 50% higher polyphosphoric acids. It is preferred to use 110 to 115% polyphosphoric acid, most preferably 115% polyphosphoric acid.

It is often desirable to neutralize, or partially neutralize, the polyphosphoric acid before addition. If neutralized polyphosphoric is used, it should be 110 to 115% polyphosphoric acid before addition of the alkaline medium. Any alkaline medium may be used to neutralize the polyphosphoric acid. It is preferred to use sodium hydroxide and/or potassium hydroxide. The acid should be added to the alkaline medium to reduce the formation of orthophosphoric acid.

103 to 115% polyphosphoric acid is readily available commercially. It is generally prepared by dehydration of orthophosphoric acid or by the addition of phosphorus pentoxide to orthophosphoric acid.

Other scale and corrosion inhibitors and additives may be used in combination with the 103 to 115% polyphosphoric acid, such as acrylates, maleates, surfactants, zinc and the like.

EXAMPLES

Examples 1 Through 6

(Threshold Scale Inhibition)

115% polyphosphoric acid was neutralized with a 17.9% sodium hydroxide solution to a pH of 7.1.

0.5 ppm (active) of the neutralized 115% polyphosphoric acid was added to a supersaturated solution containing 200 ppm $Ca^{++}$ and 735 ppm $HCO_3^-$ which represents about two times the equilibrium saturation limit of calcium carbonate. The solution had a pH of 8. The percent threshold inhibition of the calcium carbonate was determined after storing at 150° F. for 24 hours. Other inhibitors were also tested following the same procedure, at various concentrations. The results are summarized in Table I.

TABLE I

| Example | | Inhibitor | Concentration (ppm) | Percent Inhibition |
|---|---|---|---|---|
| Comparison Examples | 1 | none | 0 | 0 |
| | 2 | sodium orthophosphate ($Na_2HPO_4$) | 0.60 | 2 |
| | 3 | sodium pyrophosphoric ($Na_4P_2O_7$) | 0.50 | 87 |
| | 4 | sodium tripolyphosphate ($Na_5P_3O_{10}$) | 0.50 | 81 |
| | 5 | sodium polyphosphate (1.1 $Na_2O$: 1 $P_2O_5$) | 0.50 | 82 |
| | 6 | sodium 115% polyphosphoric (active) | 0.50 | 92 |

Example 7

(Threshold Scale Inhibition)

115% polyphosphoric acid (5% $H_3PO_4$, 15% $H_5P_3O_{10}$, 15% $H_4P_2O_7$, 15% $H_6P_4O_{13}$ and 50% polyphosphoric acid) was added in varying concentrations to a supersaturated solution containing 40 ppm $Ca^{++}$, 30 ppm $HCO_3^-$ and 30 ppm $CO_3^=$ which represents about four times the equilibrium saturation limit of calcium carbonate. The solution had a pH of about 10. The percent threshold inhibition of the calcium carbonate was determined after storing at 150° F. for 24 hours. The results are summarized in Table II.

TABLE II

| Concentration (ppm) | Percent Inhibition ($CaCO_3$) |
|---|---|
| 0 | 0 |
| 0.2 | 80 |
| 0.4 | 93 |
| 0.6 | 93 |
| 0.8 | 100 |

Example 8

(Threshold Scale Inhibition)

Example 7 was repeated using 105% polyphosphoric acid (58% $H_3PO_4$, 3.5% $H_5P_3O_{10}$ and 38% $H_4P_2O_7$. The results are summarized in Table III.

TABLE III

| Concentration (ppm) | Percent Inhibition ($CaCO_3$) |
|---|---|
| 0 | 0 |
| 0.2 | 70 |
| 0.4 | 84 |
| 0.6 | 80 |
| 0.8 | 67 |

Examples 9 Through 14

(Corrosion Inhibition)

The scale inhibitors of Examples 1 through 6 were tested for corrosion inhibition. 1"×2" steel coupons were continuously immersed in inhibited (20 ppm) and uninhibited water containing 86 ppm $Ca^{++}$, 24 ppm $Mg^{++}$, 72 ppm $Cl^-$, 328 ppm $SO_4^=$ and 40 ppm $HCO_3^-$. New solution was added after 24 hours. The solutions were continuously, mildly agitated (50 rpm). The pH of the solutions were 6.8 through 7.1. The tests were conducted at room temperature. The difference in weight of the coupon at the start of the test and at the end of two days was calculated as mils/year (mpy) corrosion rate. The results are summarized in Table IV.

TABLE IV

| | Example | Inhibitor | Concentration (ppm) | Corrosion Rates (mpy) | Percent Inhibition |
|---|---|---|---|---|---|
| | 9 | blank | Blank | 32.9 | 0.0 |
| Comparison Examples | 10 | sodium orthophosphate ($Na_2HPO_4$) | 20 | 3.6 | 89.1 |
| | 11 | sodium pyrophosphoric ($Na_4P_2O_7$) | 20 | 0.9 | 97.3 |
| | 12 | sodium tripolyphosphate ($Na_5P_3O_{10}$) | 20 | 4.3 | 86.9 |
| | 13 | sodium polyphosphate (1.1 $Na_2O$:1 $P_2O_5$) | 20 | 0.8 | 97.6 |
| | 14 | sodium 115% polyphosphoric (active) | 20 | 1.0 | 97.0 |

Example 15
(Corrosion Inhibition)

103% polyphosphoric acid (70% $H_3PO_4$, 27% $H_4P_2O_7$ and 3% $H_5P_3O_{10}$) was added to a supersaturated solution of uninhibited water containing 86 ppm $Ca^{++}$, 24 ppm $Mg^{++}$, 72 ppm $Cl^-$, 40 ppm $HCO_3^-$ and 328 ppm $SO_4^=$. 1"×2" steel coupons were continuously immersed in the solution. New solution was added after 24 hours. The solution was continuously, mildly agitated (50 rpm). The pH of the solution was 7.5±0.3. The temperature was 95° F. The difference in weight of the coupon at the start of the test and at the end of five days was calculated as mils/year (mpy) corrosion rate. The results are summarized in Table V.

TABLE V

| Inhibitor | Concentration (ppm) | Corrosion Rate (mpy) | Percent Inhibition |
|---|---|---|---|
| Blank | Blank | 32.5 | 0 |
| 103% Polyphosphoric acid | 30 | 0.31 | 99 |

What is claimed is:

1. A process for the inhibition of scale and corrosion formation in an aqueous system containing calcium, carbonate, and bicarbonate ions, comprising adding to the system about 0.1 to 100 ppm, by weight, based on the total aqueous content of said system, of about 110 to 115% neutralized polyphosphoric acid prepared by adding 110 to 115% polyphosphoric acid to an alkaline medium selected from the group consisting of sodium hydroxide and potassium hydroxide.

2. The process of claim 1, wherein said polyphosphoric acid is 115% polyphosphoric acid.

* * * * *